(12) United States Patent
Chang

(10) Patent No.: US 9,955,545 B1
(45) Date of Patent: Apr. 24, 2018

(54) LIGHTING SYSTEM

(71) Applicant: Wei Chang, New Taipei (TW)

(72) Inventor: Wei Chang, New Taipei (TW)

( * ) Notice: Subject to any disclaimer, the term of this patent is extended or adjusted under 35 U.S.C. 154(b) by 0 days.

(21) Appl. No.: 15/794,245

(22) Filed: Oct. 26, 2017

(30) Foreign Application Priority Data

Mar. 31, 2017 (TW) .............................. 106204556 U

(51) Int. Cl.
*H05B 33/08* (2006.01)
*H05B 37/02* (2006.01)
*A01K 63/06* (2006.01)

(52) U.S. Cl.
CPC ..... *H05B 33/0863* (2013.01); *H05B 33/0857* (2013.01); *H05B 37/0272* (2013.01); *H05B 37/0281* (2013.01); *A01K 63/06* (2013.01)

(58) Field of Classification Search
CPC  H05B 37/02; H05B 37/0227; H05B 37/0272; H05B 37/0281; H05B 33/0815; H05B 33/0842; H05B 33/0845; H05B 33/0854; H05B 33/0857; Y02B 20/42; Y02B 20/44; Y02B 20/48; F21S 2/00; F21S 9/022
See application file for complete search history.

(56) References Cited

U.S. PATENT DOCUMENTS

| 6,166,496 | A | * | 12/2000 | Lys | ..................... | H05B 33/0857 |
| | | | | | | 315/292 |
| 7,886,696 | B2 | * | 2/2011 | Marks | ..................... | A01K 63/04 |
| | | | | | | 119/248 |
| 8,033,686 | B2 | * | 10/2011 | Recker | ............... | H05B 33/0803 |
| | | | | | | 362/249.02 |
| 9,603,346 | B2 | * | 3/2017 | Lutz | ........................ | A01K 63/06 |
| 2010/0207532 | A1 | * | 8/2010 | Mans | ..................... | H05B 37/02 |
| | | | | | | 315/158 |

\* cited by examiner

*Primary Examiner* — Haissa Philogene

(74) *Attorney, Agent, or Firm* — Fox Rothschild LLP; Robert J. Sacco; Carol E. Thorstad-Forsyth

(57) ABSTRACT

A lighting device includes a lighting module, a storage module storing light data sets corresponding respectively to successive time points of a cycling period, and a processing unit. In a routine mode, the processing unit controls the lighting module to emit light and to successively change color of light at the successive time points of the cycling period. In an adjustment mode, the processing unit reads from the storage device one light data set corresponding to the time point indicated by a time signal from an input device, adjusts the light data set according to a color signal from the input device, and controls the lighting module to emit light based on the adjusted light data set.

14 Claims, 3 Drawing Sheets

LIGHTING SYSTEM

CROSS-REFERENCE TO RELATED APPLICATION

This application claims priority of Taiwanese Patent Application No. 106204556, filed on Mar. 31, 2017.

FIELD

The disclosure relates to a lighting system, and more particularly to a lighting system capable of successively changing color of light emitted thereby in a cycle period.

BACKGROUND

Biological rhythms of organisms may be relative to light exposure. A conventional lighting system for an aquarium is operable to not emit light during the daytime and to emit light only after nightfall, for the purpose of better showcasing the aquarium. However, the time of lighting the aquarium is controlled by user operation, which may vary on a daily basis and cause disturbance of the biological rhythms of living creatures in the aquarium, and in turn adversely affect their growth

SUMMARY

Therefore, an object of the disclosure is to provide a lighting system that can alleviate the drawback of the prior art.

According to the disclosure, the lighting system includes an input device and a lighting device.

The input device is operable to transmit a color signal and a time signal. The time signal indicates a particular one of successive time points of a cycling period. The time points are arranged in a predetermined order and are spaced apart from one another by a predetermined interval.

The lighting device is coupled to the input device for receiving the time signal and the color signal therefrom. The lighting device includes a lighting module, a storage module and a processing unit. The lighting module is configured to emit light. The storage module is configured to store a plurality of light data sets corresponding to the time points, respectively. Each of the light data sets indicates one color. The processing unit is electrically connected to the lighting module and the storage module, and is configured to operate in one of a routine mode and an adjustment mode.

The processing unit is configured to, when operating in the routine mode, control the lighting module to emit light and to change color of the light emitted from the lighting module at each one of the time points to a color indicated by one of the light data sets that corresponds to the time point, so that the color of light is changed successively to different colors at the time points in the predetermined order.

The processing unit is configured to, when the processing unit operates in the adjustment mode, read from the storage device one of the light data sets corresponding to one of the time points that is indicated by the time signal received from the input device, adjust the one of the light data sets read from the storage device according to the color signal received from the input device, and control the lighting module to emit light based on the one of the light data sets that has been adjusted.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
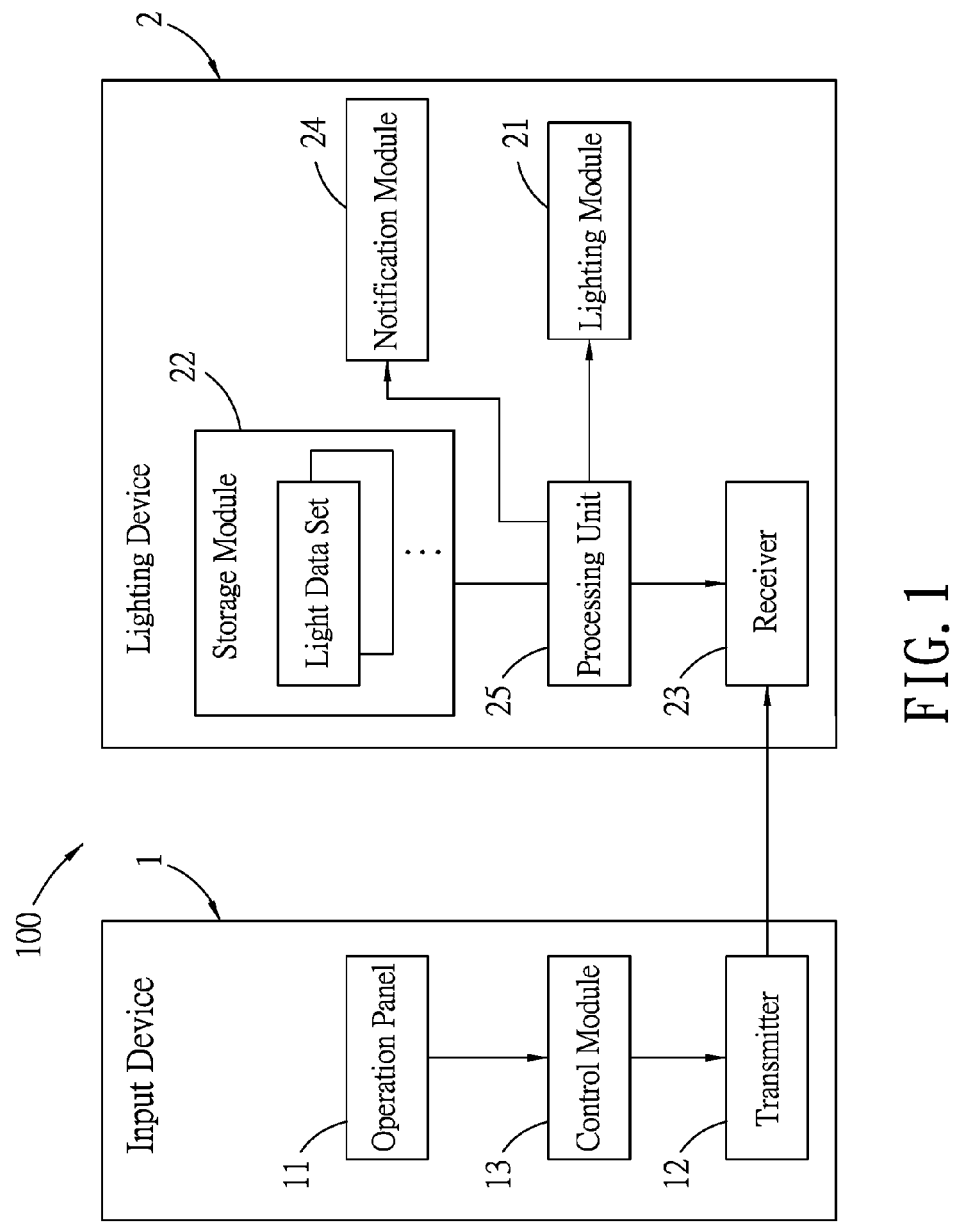
FIG. 1 is a block diagram illustrating an embodiment of the lighting system according to the disclosure.
Figure 2:
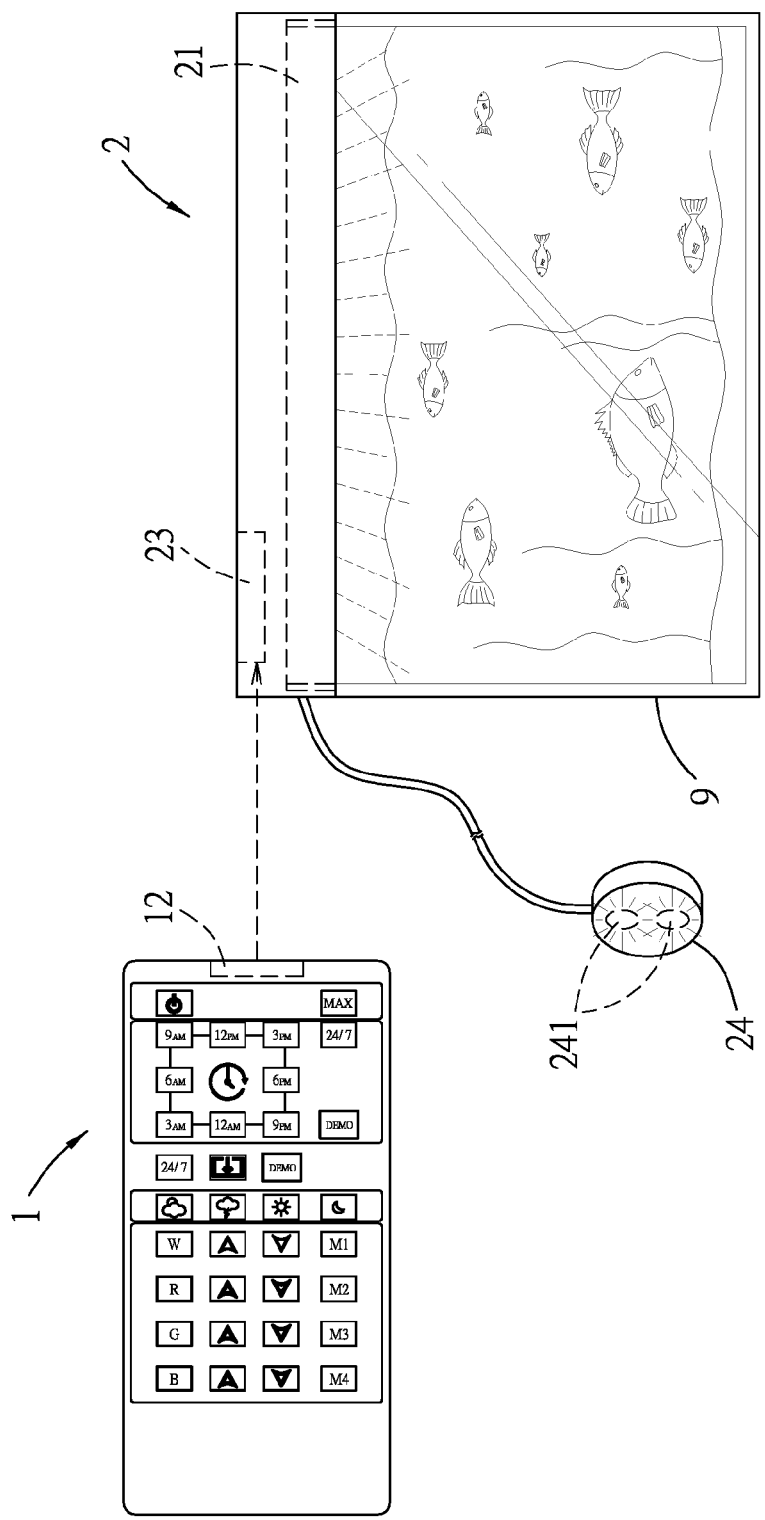
FIG. 2 is a schematic view of the embodiment of the lighting system.

Referring to FIGS. 1 and 2, an embodiment of a lighting system 100 according to the disclosure includes an input device 1 and a lighting device 2. In the embodiment, the lighting device 2 may be used in an artificial ecosystem, e.g., an aquarium 9, but is not limited thereto.

The input device 1 is coupled with the lighting device 2, and is to be operated by a user. In the embodiment, the input device 1 is a remote controller, and includes a power button 10 (see FIG. 3), an operation panel 11, a transmitter 12, and a control module 13 that is electrically connected to the operation panel 11 and the transmitter 12. The power button 10 is operable to enable the control module 13 to transmit a power signal via the transmitter 12 to the lighting device 2 so that the lighting device 2 switches between a power-ON state and a power-OFF state upon receiving the power signal. In the embodiment, the transmitter 12 is an infrared transmitter, but is not limited thereto. In one embodiment, the input device 1 may be a portable electronic device, e.g., a smart phone or a tablet, coupled to the lighting device 2. The control module 13 is configured to control the transmitter 12 to transmit signals in response to operation performed on the operation panel 11. In the embodiment, the control module 13 may be a microprocessor, but is not limited thereto.

Figure 3:
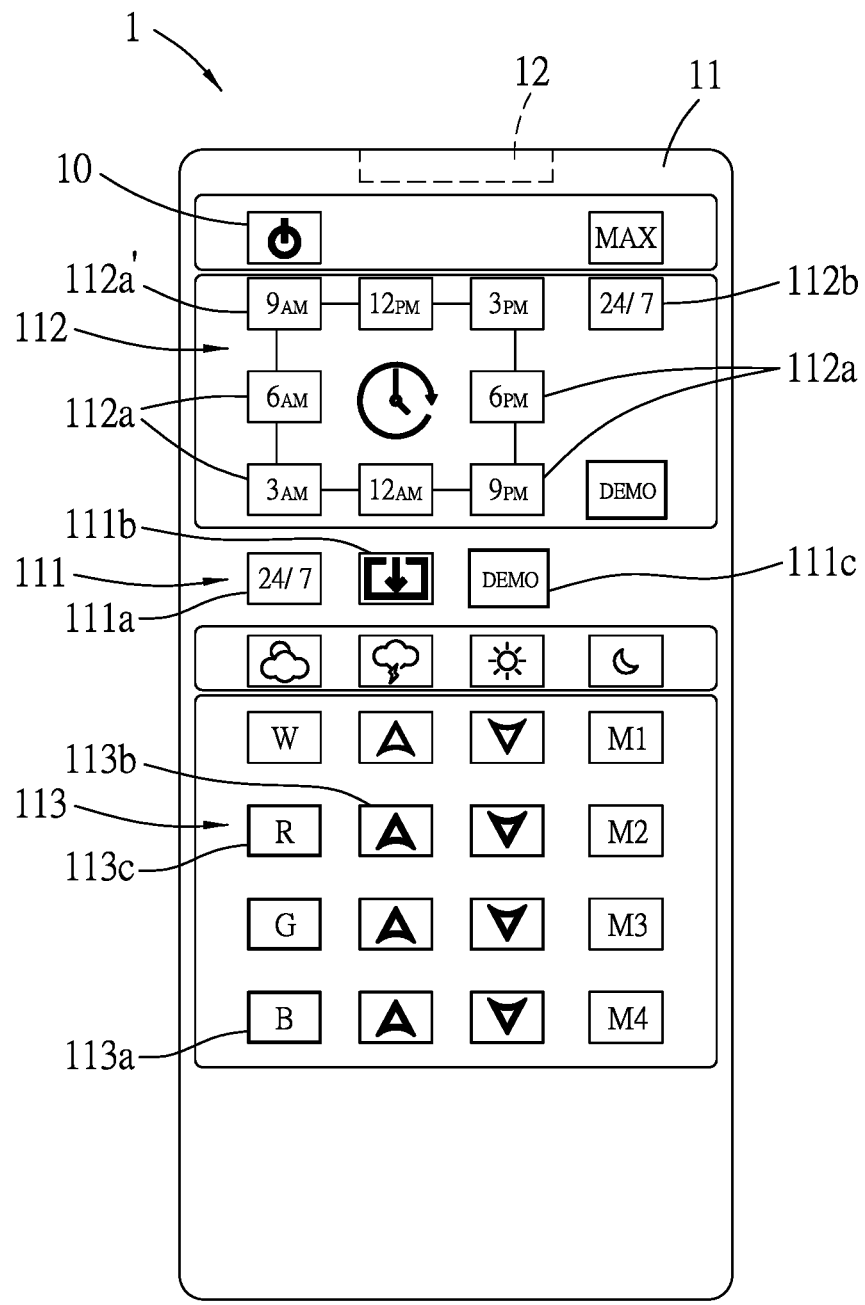
FIG. 3 is a schematic view of an exemplary input device of the lighting system according to the embodiment of the disclosure.

Referring to FIG. 3, the operation panel 11 includes a setting keyset 111, a time keyset 112 and an adjusting keyset 113. The setting keyset 111 includes an adjustment mode key (111a), a confirmation key (111b) and a function key (111c).

Particularly, the adjustment mode key (111a) is operable through user operation (e.g., clicking or pressing) to enable the control module 13 to transmit a control signal via the transmitter 12 to the lighting device 2. The confirmation key (111b) is operable through user operation (e.g., clicking or pressing) to enable the control module 13 to transmit a confirmation signal via the transmitter 12 to the lighting device 2. The function key (111c) is operable via user operation in a first manner to enable the control module 13 to transmit a cancel signal via the transmitter 12 to the lighting device 2, and is operable via user operation in a second manner that is different from the first manner to enable the control module 13 to transmit a demonstration signal via the transmitter 12 to the lighting device 2. In the embodiment, the user operation in the first manner is to press and hold the function key (111c) for 3 seconds, and the user operation in the second manner is to press and hold the function key (111c) for 1 second. It should be noted that the user operations in the first manner and in the second manner are not limited to the foregoing descriptions.

The time keyset 112 includes a plurality of time point keys (112a, 112a') and a review mode key (112b). Each of the time point keys (112a, 112a') corresponds to a respective one of time points, and is operable through user operation to enable the control module 13 to transmit a time signal indicating the respective one of the time points via the transmitter 12 to the lighting device 2. In the embodiment, the time points are 12 AM, 3 AM, 6 AM, 9 AM, 12 PM, 3 PM, 6 PM and 9 PM, and the corresponding time point keys (112*a*, 112*a'*) are labeled with the time points respectively. The review mode key (112*b*) is operable through user operation to enable the control module 13 to transmit a review signal via the transmitter 12 to the lighting device 2.

The adjusting keyset 113 is operable through user operation to enable the control module 13 to transmit a color signal indicating a particular color via the transmitter 12 to the lighting device 2. In the embodiment, the adjusting keyset 113 includes a plurality of keys, for example, four keys that are operable to enable the control module 13 to respectively transmit the color signals that indicate red, green, blue and white, respectively (e.g., the key (113*a*) corresponding to blue light and the key (113*c*) corresponding to red light shown in FIG. 3), four keys that are each operable through user operation to enable the control module 13 to transmit the color signal that indicates an increment in intensity of a respective one of red, green, blue and white light (e.g., key (113*b*) indicating an increment in intensity of red light), and four keys that are each operable through user operation to enable the control module 13 to transmit the color signal that indicates a decrement in the intensity of a respective one of the red, green, blue and white light. The adjusting keyset 113 further includes four keys that are labeled with M1, M2, M3 and M4, respectively, and that are operable through user operation to enable the control module 13 to respectively transmit the color signals which indicate four previously customized colors, respectively.

Referring to FIGS. 1 and 2, the lighting device 2 includes a lighting module 21, a storage module 22, a receiver 23, a notification module 24, and a processing unit 25 electrically connected to the lighting module 21, the storage module 22, the receiver 23 and the notification module 24.

Particularly, the lighting module 21 is configured to emit light. In the embodiment, the lighting module 21 includes four light emitting diodes (LEDs) that can emit white light, blue light, red light and green light, respectively. The lighting module 21 is controllable by the processing unit 25 to emit a mixture of different proportions of white, blue, red and green light.

The storage module 22 is configured to store light data sets corresponding to the time points, respectively. The light data sets each indicate one color. The time points are successive time points in a cycling period, arranged in a predetermined order, and spaced apart from one another by a predetermined interval. In the embodiment, the storage may be a flash memory, but is not limited thereto. Also, in the embodiment, the cycling period is twenty-four hours in length, and the predetermined interval is three hours in length. Thus, the time points are midnight, three in the morning, six in the morning, nine in the morning, noon, three in the afternoon, six in the evening, and nine in the evening. It should be noted that the disclosure is not limited to the embodiment.

The receiver 23 is an infrared receiver in the embodiment, but is not limited thereto. Further, in the embodiment, the input device 1 transmits signals, e.g., the control signal, the color signal, the time signal and so on, by means of the transmitter 12 so that the lighting device 2 receives the signals with the receiver 23. In one embodiment, the transmitter 12 and the receiver 23 may transmit and receive the signals using other wireless communication protocols, such as Wi-Fi™ and Bluetooth®.

The processing unit 25 is configured to operate in one of a routine mode, an adjustment mode, a review mode and a manual mode. In the embodiment, the processing unit 25 may be a microprocessor, but is not limited thereto. The following description explains how the processing unit 25 switches between these modes.

The processing unit 25 is configured such that when operating in the routine mode, the processing unit 25 switches to operating in the adjustment mode, the review mode and the manual mode upon receiving the control signal, the review signal and the color signal, respectively. The processing unit 25 is configured such that when operating in the adjustment mode or the review mode, the processing unit 25 switches to operating in the routine mode upon receiving the control signal or the review signal. The processing unit 25 is configured such that when operating in the manual mode, the processing unit 25 switches to operating in the adjustment mode and the review mode upon receiving the control signal and the review signal, respectively.

Particularly, when operating in the routine mode, the processing unit 25 controls the lighting module 21 to emit light and to change color of the light emitted from the lighting module 21 at each one of the time points to a color indicated by one of the light data sets that corresponds to the time point, so that the color of light is changed successively to different colors at the time points in the predetermined order in the cycling period. However, it should be noted that in the embodiment, when operating in the routine mode, the processing unit 25 controls the lighting module 21 to emit light during the entire cycling period which lasts twenty-four hours, and to change the color of the light emitted by the lighting module 21 from a color corresponding to a current one of the time points gradually to a color corresponding to a next one of the time points every three hours. For example, assuming that one of the light data sets that corresponds to nine o'clock in the morning (9 AM) indicates blue, and another one of the light data sets that corresponds to the noon (12 PM) indicates red, when the processing unit 25 operates in the routine mode, the processing unit 25 controls the lighting module 21 to emit blue light at 9 AM, and then to gradually decrease the intensity of the blue light and gradually increase the intensity of the red light, so that the color of the light emitted from the lighting module 21 becomes red by 12 PM.

When operating in the adjustment mode, the processing unit 25 reads from the storage device 22 one of the light data sets corresponding to one of the time points that is indicated by the time signal received from the input device 1, adjusts the one of the light data sets read from the storage device 22 according to the color signal received from the input device 1, and stores the one of the light data sets that has been adjusted in the storage module 22. More specifically, when operating in the adjustment mode, the processing unit 25, upon receiving the time signal from the input device 1, reads one of the light data sets corresponding to one of the time points indicated by the time signal (referred to as a selected time point hereinafter) from the storage device 22. Then, upon receiving the color signal from the input device 1, the processing unit 25 adjusts the one of the light data sets read from the storage device (referred to as the light data set thus read hereinafter) to indicate the particular color indicated by the color signal, and at the same time controls the lighting module 21 to emit light with the particular color based on the one of the light data sets that has been adjusted (referred to as an adjusted light data set hereinafter). Finally, the processing unit 25 stores the adjusted light data set in the storage module 22 in response to receipt of the confirmation signal. In one embodiment, the processing unit 25 may be configured to store the adjusted light data set in the storage module 22 without the receipt of the confirmation signal. In addition, when operating in the adjustment mode, the processing unit 25 controls, in response to receipt of the demonstration signal, the lighting module 21 to continuously emit light, and to change color of the light successively to different colors indicated by the light data sets in an order corresponding to the predetermined order for a demonstration duration that is shorter than the predetermined interval, where the demonstration duration is thirty seconds in the embodiment. Moreover, before adjusting the light data set thus read, the processing unit 25 temporarily stores the light data set thus read in a temporary storage (not shown) as an original version thereof. Therefore, when operating in the adjustment mode, the processing unit 25 stores the original version of the light data set thus read in the storage module 22 in response to receipt of the cancel signal.

When operating in the review mode, the processing unit 25 reads, upon receiving the time signal, one of the light data sets that corresponds to the selected time point, and controls the lighting module 21 to emit light with the color indicated by the light data set thus read. For example, when the processing unit 25 operates in the review mode and the user operates the time point key (112a') (see FIG. 3) that corresponds to 9 AM, the input device 1 transmits the time signal indicating 9 AM to the lighting device 2, and then the processing unit 25 controls the lighting module 21 to emit light with the color indicated by the one of the light data sets that corresponds to 9 AM for the user.

When operating in the manual mode, the processing unit 25 controls, upon receiving the color signal, the lighting module 21 to emit light with the particular color indicated by the color signal (referred to as a selected color hereinafter). For example, referring to FIGS. 1 and 3, when the processing unit 25 operates in the manual mode and the user operates the key (113a) in the adjustment keyset 113 that corresponds to blue, the processing unit 25 controls the lighting module 21 to emit blue light continuously until the processing unit 25 ceases to operate in the manual mode.

In the embodiment, the notification module 24 includes a pair of lighting elements 241 (see FIG. 2), such as one white light LED and one blue light LED, but is not limited to the foregoing example. The lighting elements 241 of the notification module 24 are configured to emit light with respective colors, and to output a notification that indicates which mode the processing unit 25 is currently operating in, or which operation the processing unit 25 is currently performing under one of the aforementioned modes. Specifically, in the embodiment, the notification module 24 can output the notification by flashing of the white light LED, flashing of the blue light LED, or combinations thereof. For example, when operating in the adjustment mode, the processing unit 25 controls the notification module 24 to output a first notification to indicate the adjustment mode, in which the first notification is expressed by simultaneous flashing of the white light LED and the blue light LED. When operating in the review mode, the processing unit 25 controls the notification module 24 to output a second notification to indicate the review mode, in which the second notification is expressed by flashing of the blue light LED while the white light LED is turned off. When operating in the manual mode, the processing unit 25 controls the notification module 24 to output a third notification to indicate the manual mode, in which the third notification is expressed by flashing of the white light LED while the blue light LED is turned off. When operating in the adjustment mode, the processing unit 25 controls the notification module 24 to output a fourth notification to indicate the receipt of the time signal from the input device 1 in response to said receipt, in which the fourth notification is expressed by alternate flashing of the white light LED and the blue light LED.

In practical use, when the user operates the power button 10 to switch the lighting device 2 to the power-ON state, the processing unit 25 operates in the routine mode by default. Therefore, when the processing unit 25 operates in the routine mode and the user operates the adjustment mode key (111a), the processing unit 25 switches to operating in the adjustment mode and controls the notification module 24 to output the first notification to indicate the adjustment mode. Then, if the user operates the time point key (112a') corresponding to 9 AM, the processing unit 25 reads the one of the light data sets (i.e., the light data set thus read) that corresponds to 9 AM from the storage module 22 and controls the notification module 24 to output the fourth notification to indicate the selection of the one of the light data sets that corresponds to 9 AM. Next, if the user operates the key (113b) in an attempt to increase the intensity of a red light portion in the light emitted by the lighting module 21, the processing unit 25 adjusts the light data set thus read by increasing a value representing the intensity of the red light portion in the light data set thus read, and controls the lighting module 21 to emit light of which the intensity of red light portion is increased based on the adjusted light data set. At this moment, if the user wishes to inspect the colors designated to the respective time points, the user may operate the function key (111c) in the second manner, so the processing unit 25 controls the lighting module 21 to emit light with colors varying in the predetermined order based on the light data sets for the demonstration duration, e.g., thirty seconds. When the user confirms that all of the colors corresponding to the respective time points have been set correctly, the user should operate the confirmation key (111b) so that the processing unit 25 stores the adjusted light data set(s) in the storage module 22. Otherwise, when the user wants to cancel all changes made on the light data set(s), the user only needs to operate the function key (111c) in the first manner, so the processing unit 25 stores the original version of the light data set(s) thus read back in the storage module 22.

Afterward, the user may operate the adjustment mode key (111a), so the processing unit 25 switches to operating in the routine mode.

When the user wants to check one of the colors indicated by one of the light data sets corresponding to a specific time point, the user is to operate the review mode key (112b), so the processing unit 25 switches to operating in the review mode, and controls the notification module 24 to output the second notification indicating the review mode. The user can then operate, e.g., the time point key (112a') corresponding to 9 AM, so the processing unit 25 controls the lighting module 21 to emit light based on one of the light data sets corresponding to 9 AM. When the user operates the review mode key (112b) once again, the processing unit 25 switches to operating in the routine mode, controls the lighting module 21 to emit light based on one of the light data sets corresponding to a current time, and successively changes color of light emitted from the lighting module 21 in the predetermined order in the cycling period (of twenty-four hours) based on other ones of the light data sets respectively corresponding to the subsequent time points. It should be noted that the user is usually inclined to operate the time point key (112a or 112a') corresponding to one of the time points that is closest to the current time. In the foregoing example, the user operates the time point key (112a') at around 9 AM.

Furthermore, when the user wants the lighting module 21 to emit light with a particular color, such as red, the user may operate the input device 1 to make the processing unit 25 operate in the routine mode, and press the key (113c) of the adjustment keyset 113, so that the processing unit 25 switches to operating in the manual mode, controls the lighting module 21 to emit red light, and controls the notification module 24 to output the third notification indicating the manual mode to the user.

In summary, the lighting device 2 of the embodiment according to the disclosure can continuously emit light and change the color of the light successively based on the light data sets in the predetermined order during the cycling period. Therefore, the lighting device 2 can simulate natural light the color of which changes over time so that disturbance of biological rhythms of organisms that are exposed to the light emitted by the lighting device 2 can be prevented, and the organisms can grow normally. Furthermore, by using the processing unit 25 to control the lighting module 21, automation of the lighting system 100 according to the disclosure is realized and the lighting system 100 may be used with ease. Moreover, the light data sets can be adjusted flexibly by operating the input device 1, thus the lighting system 100 can be adopted for different usage and situations. In addition, due to the notification module 24 outputting the notification that indicates which mode the processing unit 25 is operating in, the user can be informed of the status of the lighting device 2.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lighting system comprising:
   an input device operable to transmit a color signal that is associated with a color, and a time signal that indicates a particular one of successive time points of a cycling period, the time points being arranged in a predetermined order and being spaced apart from one another by a predetermined interval; and
   a lighting device coupled to said input device for receiving the time signal and the color signal therefrom, and including
      a lighting module that is configured to emit light,
      a storage module that is configured to store a plurality of light data sets corresponding to the time points, respectively, the light data sets each indicating one color, and
      a processing unit that is electrically connected to said lighting module and said storage module, and is configured to operate in one of a routine mode and an adjustment mode,
   wherein said processing unit is configured to, when operating in the routine mode, control said lighting module to emit light and to change color of light emitted from said lighting module at each one of the time points to a color indicated by one of the light data sets that corresponds to said time point, so that the color of light is changed successively to different colors at the time points in the predetermined order,
   wherein said processing unit is configured to, when operating in the adjustment mode, read from said storage device one of the light data sets corresponding to one of the time points that is indicated by the time signal received from said input device, adjust said one of the light data sets read from said storage device according to the color signal received from said input device, and control said lighting module to emit light based on said one of the light data sets that has been adjusted.

2. The lighting system of claim 1, wherein said input device includes an operation panel that includes a setting keyset, the setting keyset including an adjustment mode key operable through user operation to enable said input device to transmit a control signal to said processing unit of said lighting device,
   wherein said processing unit is configured to, when operating in the routine mode, switch to operating in the adjustment mode upon receiving the control signal, and
   wherein said processing unit is configured to, when operating in the adjustment mode, switch to operating in the routine mode upon receiving the control signal.

3. The lighting system of claim 2, wherein said operation panel further includes:
   a time keyset including a plurality of time point keys, each of said time point keys corresponding to a respective one of the time points and being operable through user operation to enable said input device to transmit the time signal indicating the respective one of the time points; and
   an adjusting keyset operable through user operation to enable said input device to transmit the color signal indicating a particular color,
   wherein said processing unit is configured to, when operating in the adjustment mode,
      upon receiving the time signal from said input device, read, from said storage device, one of the light data sets corresponding to one of the time points indicated by the time signal from said storage device,
      upon receiving the color signal from said input device, adjust said one of the light data sets read from said storage device to indicate the particular color indicated by the color signal, and
      control said lighting module to emit light with the particular color based on said one of the light data sets that has been adjusted.

4. The lighting system of claim 2, wherein said setting keyset further includes a confirmation key that is operable through user operation to enable said input device to transmit a confirmation signal, wherein said processing unit is configured to, when operating in the adjustment mode, store said one of the light data sets that has been adjusted in said storage module in response to receipt of the confirmation signal.

5. The lighting system of claim 4, wherein said setting keyset further includes a function key that is operable through user operation in a first manner to enable said input device to transmit a cancel signal, wherein said processing unit is configured to, when operating in the adjustment mode, store an original version of said one of the light data sets without being adjusted in said storage module in response to receipt of the cancel signal.

6. The lighting system of claim 5, wherein said function key is further operable through user operation in a second manner to enable said input device to transmit a demonstration signal, the second manner being different from the first manner, wherein said processing unit is configured to, when operating in the adjustment mode, control, in response to receipt of the demonstration signal, said lighting module to emit light and to change color of the light emitted from said lighting module successively to different colors indicated by the light data sets in an order corresponding to the predetermined order for a demonstration duration that is shorter than the predetermined interval.

7. The lighting system of claim 1, wherein said lighting device further includes a notification module electrically connected to said processing unit, wherein said processing unit is further configured to, when operating in the adjustment mode, control said notification module to output a notification to indicate the adjustment mode.

8. The lighting system of claim 7, wherein said processing unit is further configured to operate in a review mode, wherein said processing unit is configured to, when operating in the review mode, read, upon receiving the time signal, one of the light data sets that corresponds to one of the time points indicated by the time signal, control said lighting module to emit light with the color indicated by said one of the light data sets, and control said notification module to output a notification to indicate the review mode.

9. The lighting system of claim 7, wherein said processing unit is further configured to operate in a manual mode, wherein said processing unit is configured to, when operating in the manual mode, control, upon receiving the color signal, said lighting module to emit light with a color indicated by the color signal, and control said notification module to output a notification to indicate the manual mode.

10. The lighting system of claim 9, wherein said input device is further operable through user operation to transmit a control signal to said processing unit, wherein said processing unit is configured to, when operating in the routine mode, switch to operating in the adjustment mode upon receiving the control signal, wherein said processing unit is configured to, when operating in the adjustment mode, switch to operating in the routine mode upon receiving the control signal, wherein said processing unit is configured to, when operating in the routine mode, switch to operating in the manual mode upon receiving the color signal, wherein said processing unit is configured to, when operating in the manual mode, switch to operating in the adjustment mode upon receiving the control signal.

11. The lighting system of claim 7, wherein said processing unit is configured to, when operating in the adjustment mode, further control, upon receiving the time signal, said notification module to output a notification to indicate the receipt of the time signal from the input device.

12. The lighting system of claim 7, wherein said notification module includes a plurality of lighting elements configured to emit light with respective different colors.

13. The lighting system of claim 1, wherein said processing unit is configured to, when operating in the routine mode, control said lighting module to change the color of light emitted by said lighting module from a color corresponding to a current one of the time points gradually to a color corresponding to a next one of the time points.

14. The lighting system of claim 1, wherein the cycling period is twenty-four hours in length.

* * * * *